US009166484B2

(12) United States Patent
Rooijackers (10) Patent No.: US 9,166,484 B2
(45) Date of Patent: Oct. 20, 2015

(54) RESONANT CONVERTER (71) Applicant: NXP B.V., Eindhoven (NL)

(72) Inventor: Cornelis Jozef Petrus Maria Rooijackers, Eindhoven (NL)

(73) Assignee: NXP B.V., Eindhoven (NL)

( * ) Notice: Subject to any disclaimer, the term of this patent is extended or adjusted under 35 U.S.C. 154(b) by 6 days.

(21) Appl. No.: 14/179,431

(22) Filed: Feb. 12, 2014

(65) Prior Publication Data

US 2014/0232282 A1    Aug. 21, 2014

(30) Foreign Application Priority Data

Feb. 20, 2013  (EP) ..................................... 13156043

(51) Int. Cl.
| H05B 37/00 | (2006.01) |
| H02M 3/335 | (2006.01) |
| H05B 33/08 | (2006.01) |
| H02M 3/337 | (2006.01) |
| H02M 1/00 | (2007.01) |

(52) U.S. Cl.
CPC .......... *H02M 3/33507* (2013.01); *H02M 3/337* (2013.01); *H02M 3/33523* (2013.01); *H05B 33/0815* (2013.01); *H02M 2001/0003* (2013.01); *Y02B 70/1433* (2013.01)

(58) Field of Classification Search
CPC .. H05B 37/02; H05B 37/029; H05B 41/2325; H05B 41/28; H05B 41/2821; H05B 41/2827; H05B 41/2828; H05B 41/2856; Y02B 20/204; Y02B 20/324; Y02B 70/1416; Y02B 70/1433

USPC ............. 315/177, 219–221, 224, 244, 209 R, 315/291, 307, 312, 282, 278, 294; 363/17, 363/21.01, 21.02, 132, 97, 98; 361/212
See application file for complete search history.

(56) References Cited

U.S. PATENT DOCUMENTS

| 5,235,501 A * | 8/1993 | Stuart et al. ...................... 363/17 |
| 7,889,477 B2 * | 2/2011 | Neubarth et al. ............. 361/212 |
| 8,723,428 B2 * | 5/2014 | Yao ............................... 315/177 |

(Continued)

FOREIGN PATENT DOCUMENTS

| DE | 42 44 5313 A1 | 7/1994 |
| JP | 57-79532 A | 5/1982 |

OTHER PUBLICATIONS

Fairchild Semiconductor Corporation "AN-9729. LED Application Design Guide Using Half-Bridge LLC Resonant Converter for 100W Street Lighting, Fairchild Application Note. 16", pp. 1-17 (Nov. 16, 2012).

STMicrelectronics "AN3424 Application Note, STEVAL-ILL042V1: High Power Factor Flyback LED Driver Based on the L6562A and TSM101", pp. 1-22 (Nov. 2011).

(Continued)

*Primary Examiner* — Haissa Philogene (57) ABSTRACT

Consistent with an example embodiment, a resonant converter comprises a signalling transformer that is used to transfer information between the secondary winding and primary winding of the converter whilst maintaining mains isolation between the two sides. In the embodiment, according to the disclosure, the use of a signalling transformer (in addition to a switching, or resonant, transformer) eliminates the need for an opto-coupler to transfer information and so allows for the construction of a simpler, more reliable and/or cheaper resonant converter. Other embodiments described herein may be suitable for use in dimmable LED driver applications, for example.

14 Claims, 4 Drawing Sheets

(56) References Cited

U.S. PATENT DOCUMENTS

| | | |
|---|---|---|
| 2004/0217749 A1 | 11/2004 | Orr et al. |
| 2012/0176818 A1 | 7/2012 | Gati |
| 2012/0181940 A1 | 7/2012 | Snelten et al. |
| 2012/0320638 A1* | 12/2012 | Boysen et al. ............. 363/21.02 |
| 2013/0148384 A1* | 6/2013 | Kim et al. ................. 363/21.02 |

OTHER PUBLICATIONS

NXP B. V. "UBA20270, 600 V Driver IC for Dimmable Compact Fluorescent Lamps", pp. 1-32 (Sep. 8, 2011.

Extended European Search Report for EP Patent Appln. No. 13156043.5 (Aug. 16, 2013).

* cited by examiner

RESONANT CONVERTER

CROSS-REFERENCE TO RELATED APPLICATIONS

This application claims the priority under 35 U.S.C. §119 of European patent application no. 13156043.5, filed on Feb. 20, 2013, the contents of which are incorporated by reference herein.

The present disclosure relates to the field of resonant converters. Specifically, although not exclusively, the present disclosure relates to a resonant converter for a dimmable LED driver.

An application note AN3424, "STEVAL-ILL042V1: high power factor flyback LED driver based on the L6562A and TSM101", November 2011, Doc ID 018991 Rev 1, by STMicrelectronics describes a flyback converter used to drive a 60 W LED array. The configuration uses an isolated feedback with an opto-coupler.

An application note AN-9729, "LED Application Design Guide Using Half-Bridge LLC Resonant Converter for 100 W Street Lighting", 16 Nov. 2012, Rev. 1.0.1, by Fairchild Semiconductor Corporation describes an LED driving system that uses a resonant converter for high power LED lighting applications, such as outdoor street lighting. Resonant switching techniques allow power supply converters to operate with reduced switching losses.

In resonant converters a resonant tank is associated with a primary winding of a switching transformer. A square wave input is applied to the resonant tank and primary winding. The current floating in the resonant tank is a sine wave as the higher harmonics of the square wave cannot pass the inductors. Therefore, in a resonant converter there is no period without a current floating in the primary winding, unlike in a flyback converter where the switching transformer has periods when there is no current in the primary winding. Resonant converters typically have lower switching losses and produce less noise than flyback converters, but can require that information regarding the power conditions at the secondary side of the switching transformer must be fed back to the primary side by an opto-coupler. The Fairchild application note discloses a pulse frequency modulation controller that has a pin for connecting to an opto-coupler to control a switching frequency in order to regulate the output voltage/current.

According to an aspect of the invention there is provided a resonant converter having a primary side for receiving a DC voltage from an input power supply and a secondary side for providing a DC output voltage, the resonant converter comprising:
  a first converter switch;
  a second converter switch coupled in series with the first converter switch, wherein the first and second converter switches are provided across the input power supply;
  a switching transformer with a primary side winding and a secondary side winding, wherein the primary side winding is coupled in parallel with the second converter switch, the switching transformer configured to transfer energy from the primary side winding to the secondary side winding of the switching transformer;
  a resonant tank associated with the primary side winding of the switching transformer;
  a signalling transformer with a primary side winding and a secondary side winding, wherein the secondary side winding of the signalling transformer is connected to the secondary side winding of the switching transformer and configured to transfer a signal from the secondary side winding of the signalling transformer to the primary side winding of the signalling transformer; and
  a primary side controller configured to control the first and second converter switches in response to the signal received at the primary side winding of the signalling transformer.

The provision of a signalling transformer to transfer information across an isolation of the resonant converter may provide a less complex and/or cheaper solution than using an opto-isolator and associated components. The resonant converter may be less complex, occupy a reduced PCB area and incur a smaller bill of material than a comparable opto-isolator feedback control system.

The primary and/or secondary windings of the signalling transformer may have a substantially lower inductance than the primary and/or secondary windings of the switching transformer. The inductance of the signalling transformer may be 3 orders of magnitude (for example a 1000 times) lower than the inductance of the switching transformer. As the signalling transformer is not necessarily required to transfer substantial power, additional size and cost benefits may be obtained by providing a signalling transformer that has a substantially lower inductance (and so is physically smaller) than the switching transformer.

The signalling transformer may be substantially isolated from a magnetic field generated by the switching transformer. Isolation of the signalling transformer from the switching transformer ensures that the constantly oscillating current with the switching transformer does not interfere with the signal transferred by the signalling transformer.

The primary side controller may be configured to control the first and second converter switches in order to provide a constant current at the output power supply. Such a configuration may be particularly suited to specific applications, such as LED driver circuits.

The secondary side winding of the signalling transformer may be coupled in series with the secondary side winding of the switching transformer. This can enable a feedback signal representative of output current to be passed to the primary side.

The secondary side winding of the signalling transformer may be coupled in parallel with a sense resistor. This can enable a feedback signal representative of output voltage to be passed to the primary side.

The resonant converter may comprise a smoothing capacitor. The smoothing capacitor may be provided across output terminals of the resonant converter. The smoothing capacitor may be coupled to the secondary side winding of the switching transformer. The smoothing capacitor may assist in providing a more uniform output signal.

The switching transformer may have a first secondary side winding and a second secondary side winding. The signalling transformer may have a first secondary side winding and a second secondary side winding. The first terminal of the first secondary side winding of the switching transformer may be coupled to a first terminal of the second secondary side winding of the switching transformer. The first terminal of the first secondary side winding of the switching transformer may be coupled to ground. A second terminal of the first secondary side winding of the switching transformer may be coupled to a first terminal of the first secondary side winding of the signalling transformer. A second terminal of the second secondary side winding of the switching transformer may be coupled to a first terminal of the second secondary side winding of the signalling transformer. Such an arrangement allows power to be transferred to the output of the resonant converter irrespective of the direction of current in the switching transformer.

A second terminal of the first secondary side winding of the signalling transformer may be coupled to a load terminal. A second terminal of the second secondary side winding of the signalling transformer may be coupled to the load terminal. The load terminal may be respectively coupled to the first and second secondary side windings of the signalling transformer by first and second rectifiers. The polarity of the first rectifier may be the same as the polarity of the second rectifier. The first and second rectifiers may be synchronous rectifiers. Synchronous rectification may provide a more power efficient resonant converter than diode rectification, for example.

The signalling transformer may comprise an additional secondary side winding. The resonant converter may comprise a secondary side controller that is configured to control a flow of energy through the additional secondary side winding in response to receiving a control signal or in response to a current in the secondary side of the resonant converter. The additional secondary side winding may be used to transfer information between the isolated primary and secondary sides.

The secondary side controller may be configured to short circuit the additional secondary side winding in response to receiving the control signal or in response to a current in the secondary side of the resonant converter. The secondary side controller may be configured to receive the command as a user input.

The resonant tank may comprise a capacitor and an inductor.

According to another aspect of the invention there is provided a light emitting diode driver circuit comprising the resonant converter.

Embodiments of the present invention will now be described by way of example and with reference to the accompanying drawings in which:

FIG. 4b illustrates a schematic of an alternative arrangement of the primary side of the signalling transformer of FIG. 4a;

FIG. 4c illustrates a schematic of a primary side controller suitable for controlling the resonant converter of FIG. 4a;

FIG. 4d illustrates a schematic of a down-transformer and a primary side rectifier suitable for providing a DC input power supply to the resonant converter of FIG. 4a.

This disclosure generally relates to a resonant converter that comprises a signalling transformer that is used to transfer information between the secondary winding and primary winding of the converter whilst maintaining mains isolation between the two sides. The use of a signalling transformer (in addition to a switching, or resonant, transformer) eliminates the need for an opto-coupler to transfer information and so allows for the construction of a simpler, more reliable and/or cheaper resonant converter. The resonant converters described herein may be suitable for use in dimmable LED driver applications, for example.

Figure 1:
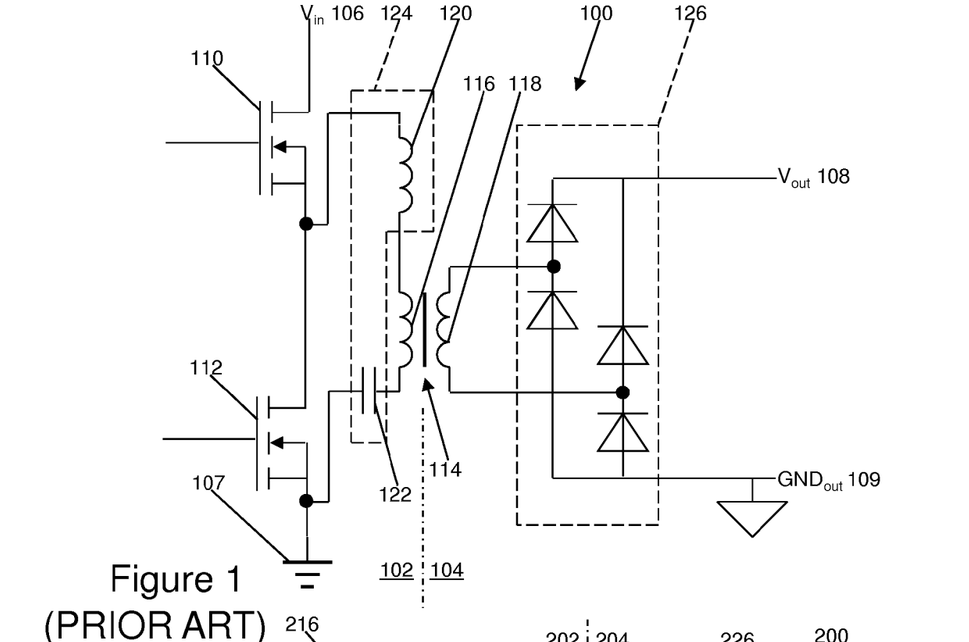
FIG. 1 illustrates a schematic of a conventional resonant converter.

FIG. 1 illustrates a conventional half-bridge LC series resonant circuit 100, similar to that described with reference to FIG. 1 of the Fairchild AN-9729 application note. The resonant converter 100 is an example of a DC-DC converter that rapidly toggles connection of an input power supply 106 to a primary side of a switching transformer 114 to produce an alternating current that is passed to a secondary side of the switching transformer 114. The AC signal at the secondary side of the switching transformer 114 is then rectified to provide a DC output at output terminals 108, 109. The DC output can in turn be used as a power supply.

The resonant converter 100 has a primary side 102 for receiving a voltage from the input power supply 106 and a secondary side 104 for providing the DC output voltage. The resonant converter 100 comprises a first converter switch 110 and a second converter switch 112. The second converter switch 112 is coupled in series with the first converter switch 110. The first and second converter switches 110, 112 are FETs in this example. Conduction channels of the respective first and second converter switches 110, 112 are provided in series between the input power supply 106 and ground 107. A first terminal of the conduction channel of the first converter switch 110 is coupled to the input power supply 106. A second terminal of the conduction channel of the first converter switch 110 is coupled to first terminal of the conduction channel of the second converter switch 112. A second terminal of the conduction channel of the second converter switch 112 is coupled to ground 107.

The switching transformer 114 has a primary side winding 116 and a secondary side winding 118. The first and second converter switches 110, 112 enable periodic connection and disconnection of the input power supply 106 to the primary side winding 116 of the switching transformer 114 as is known in the art.

The switching transformer 114 is configured to transfer energy from its primary side winding 116 to its secondary side winding 118. It will be appreciated that a current is constantly flowing through the primary side winding 116 and therefore the switching transformer 114 of a resonant converter 100 is constantly transferring energy when it is in use.

The primary side winding 116 is coupled in parallel with the second converter switch 112. A shunt inductor 120 is provided between a first terminal of the primary side winding 116 and the first terminal of the conduction channel of the second converter switch 112. A shunt capacitor 122 is provided between a second terminal of the primary side winding 116 and a second terminal of the conduction channel of the second converter switch 112. The shunt inductor 120 and capacitor 122 provide a resonant tank 124. The resonant tank and any load connected to the output terminals 108, 109 act as a potential divider. By varying the operating frequency of the first and second converter switches 110, 112, the impedance of the resonant tank can be altered. Various control circuits for controlling the operation of the first and second converter switches 110, 112 of the resonant converter are known in the art and this topic will not be discussed in detail here.

The secondary side winding 118 has a first terminal and a second terminal. The first and second terminals of the secondary side winding 118 are coupled to a bridge rectifier 126. The bridge rectifier 126 provides a DC voltage at the output terminals 108, 109.

In this way, the resonant converter 100 can allow a desired DC output power level to be achieved from a DC input power supply 106 by suitable control of the first and second converter switches 110, 112.

Similar components between the various figures are provided with corresponding reference numerals and will not necessarily be discussed again in any detail with regard to subsequent figures.

Figure 2:
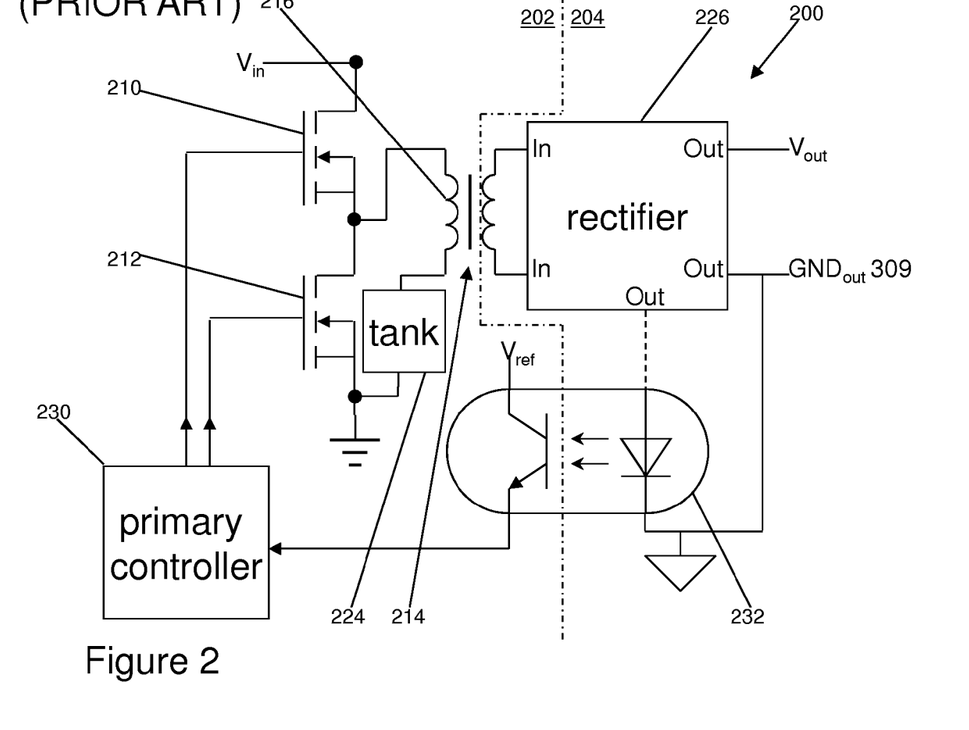
FIG. 2 illustrates a schematic of a resonant converter with a primary controller that receives information via an optocoupler.

FIG. 2 illustrates a modification to the resonant converter of FIG. 1 where a primary side controller 230 is provided to control respective duty cycles of first and second converter switches 210, 212. The primary side controller 230 is configured to control the first and second converter switches 210, 212 in response to a signal received from the secondary side 204 of the resonant converter 200 via an opto-coupler 232.

The provision of the opto-coupler 232 to send information from the secondary side 204 of the resonant converter 200 to the primary side 202 allows feedback in order to ensure that a desired output level is maintained. The resonant converter may be required to provide a constant voltage, power or current at its output. In some applications a constant output power may be required under a variable load. In such examples, the information transferred by the opto-coupler 232 may be representative of the current, voltage or power at the output of the resonant converter 200.

The opto-coupler 232 allows electrical isolation between the primary side 202 and the secondary side 204 of the resonant converter 200 to be maintained. However, the opto-coupler may require complicated driver circuitry (not shown) in order to function. For example, the Fairchild Semiconductor Corporation application note AN-9729 illustrates an opto-isolator feedback control system that requires about twenty five components to drive the opto-coupler.

The resonant converter 200 is illustrated with an abstract representation of a resonant tank 224 that is associated with, and provided in series with, the primary side winding 216 of the switching transformer 214. The resonant tank 224 may contain any arrangement of components that provide an impedance.

The resonant converter 200 is also illustrated with an abstract representation of a rectifier 226. The rectifier 226 may be provided as a full bridge rectifier as shown in FIG. 1. Alternatively, any other known arrangement of the rectifier 226 may be provided as will be apparent to those skilled in the art. For example, the rectifier 226 may be provided as a half bridge rectifier or an active/synchronous rectifier that may use MOSFETs.

Figure 3:
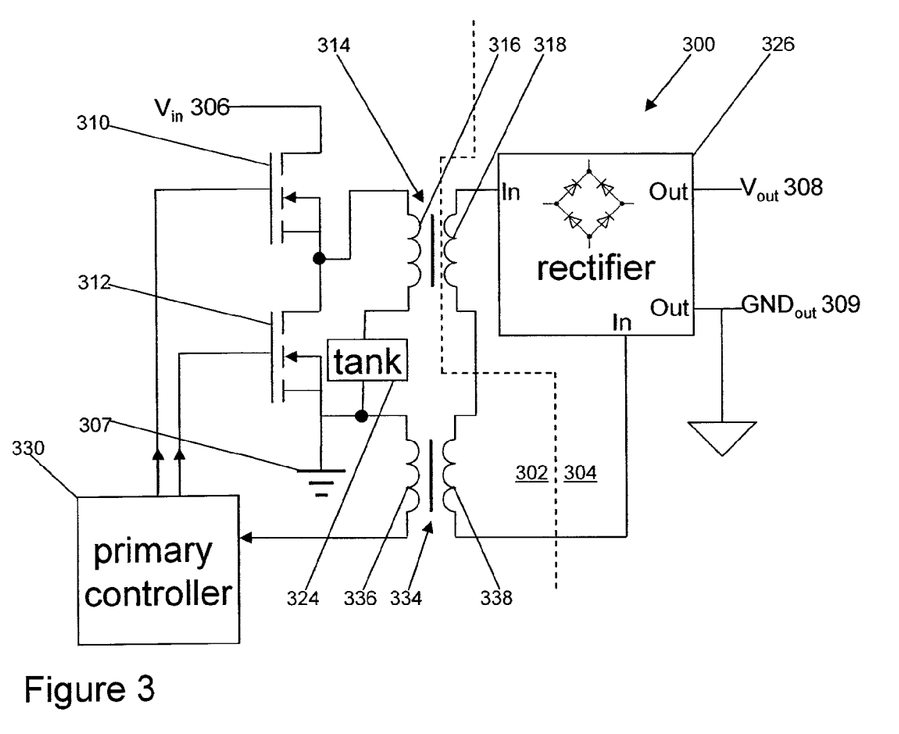
FIG. 3 illustrates a schematic of another resonant converter with a primary controller that receives information from a signalling transformer.

FIG. 3 illustrates a schematic of another resonant converter 300 comprising a primary controller 330 that receives information from the secondary side of the resonant converter 300 via a signalling transformer 334. The arrangement of: first and second converter switches 310, 312; a switching transformer 314 with a primary side winding 316 and a secondary side winding 318; a resonant tank 324; a rectifier 326; a power supply input terminal 306 and output terminal 308 of FIG. 3 are similar to those described with reference to FIG. 2 above.

Information can be sent from the secondary side 304 of the resonant converter 300 to the primary side 302 of the resonant converter 300 by means of the signalling transformer 334. The signalling transformer 334 performs the function of the opto-coupler shown in FIG. 2 in that it allows a signal to be provided from the secondary side 304 of the resonant converter 300 to the primary side 302 (or vice versa) whilst maintaining electrical isolation between the primary and secondary sides 302, 304. By replacing the opto-coupler and associated circuitry with the signalling transformer 334, the complexity of the resonant converter can be reduced.

The signalling transformer 334 is separate, or substantially isolated, from the switching transformer 314 in that there is not substantial magnetic coupling between the signalling transformer 334 and the switching transformer 314. Isolation of the signalling transformer 334 from the switching transformer 314 ensures that the signal transferred by the signalling transformer 334 does not interfere with the constantly oscillating current through the switching transformer 314.

The signalling transformer 334 has a primary side winding 336 and a secondary side winding 338. The skilled person will appreciate that DC currents or voltages cannot be transferred across a transformer; only AC currents/voltages can be transferred between windings of a transformer. The secondary side winding 338 of the signalling transformer 334 is connected in series between the secondary side winding 318 of the switching transformer 314 and an input to the rectifier 326. In this way an AC current through the secondary side winding 318 of the switching transformer 314 also flows through to the secondary side winding 338 of the signalling transformer 334. The secondary side winding 338 of the signalling transformer 334 is configured to transfer a signal to the primary side winding 336 of the signalling transformer 334. The primary side winding 336 of the signalling transformer 334 is coupled between ground and a control input of the primary side controller 330. In this way, the primary side controller 330 can receive a signal from the secondary side 304 of the resonant converter 300 via the signalling transformer 334.

It will be appreciated that there are many possible ways in which the secondary side winding 318 of the switching transformer 314 and the secondary side winding 338 of the signalling transformer 334 may be connected to one another. For example, the secondary side winding 338 of the signalling transformer 334 may be connected in parallel with the secondary side winding 318 of the switching transformer 314. In a further example a sense resistor can be provided in series with the secondary side winding 318 of the switching transformer 314, and the secondary side winding 338 of the signalling transformer 334 can be provided in parallel with the sense resistor. Or phrased in an alternative way, the secondary side winding 338 of the signalling transformer 334 can be coupled in parallel with a sense resistor. In this way, a voltage level, rather than a current level, may be used as feedback across the signalling transformer 334. Such an arrangement may be particularly useful where the resonant converter 300 is required to deliver a large output current (for example, 2 A or higher). In such examples, the windings of the signalling transformer 334 (which may also be referred to as a sensing transformer) can be provided with a high enough inductance such that the parallel combination of the winding of the signalling transformer 334 and the sense resistor does not cause too much current to pass through the winding as this will influence the voltage at the primary side of the signalling transformer 334.

The signal that is to be communicated to the primary side 302 of the resonant converter 300 may be representative of a voltage, current or power level at the secondary side 304 of the resonant converter 300, for example.

Figure 4A:
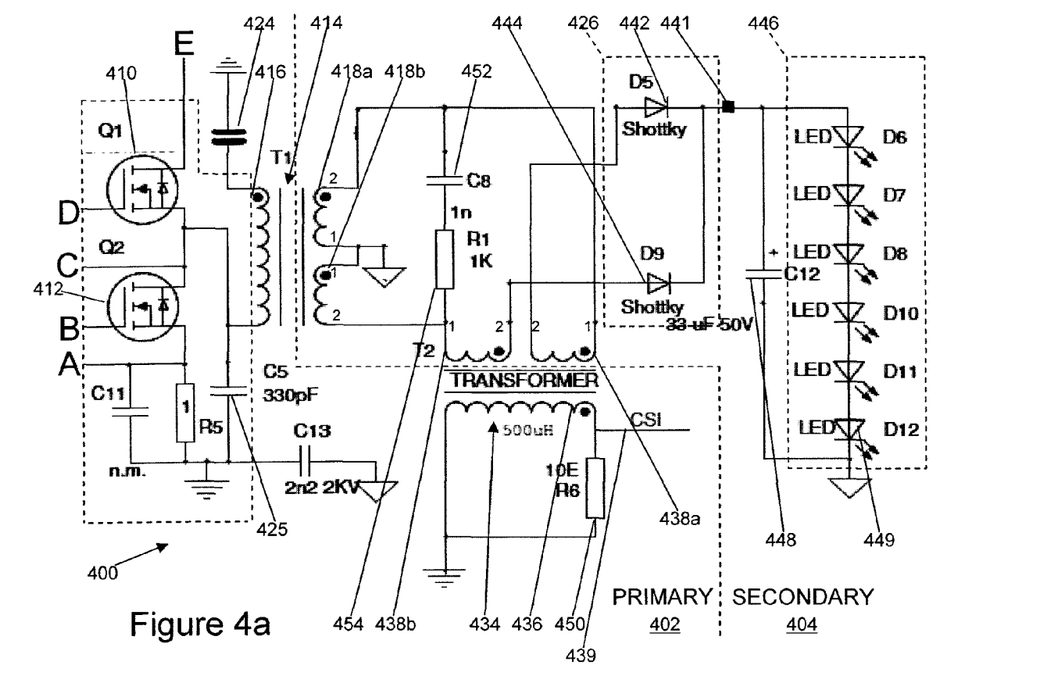
FIG. 4a illustrates a schematic of a portion of another resonant converter that comprises a signalling transformer for providing information from the secondary side of the converter to the primary side.

FIG. 4a illustrates a schematic of a portion of another resonant converter 400. The resonant converter 400 shown in FIG. 4a comprises a signalling transformer 434 for providing information from a secondary side 404 to a primary side 402 of the resonant converter 400.

Figure 4B:
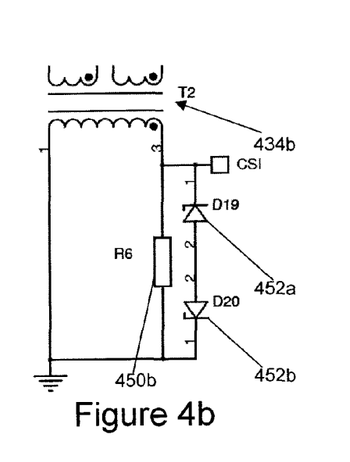
Figures 4C, 4D:
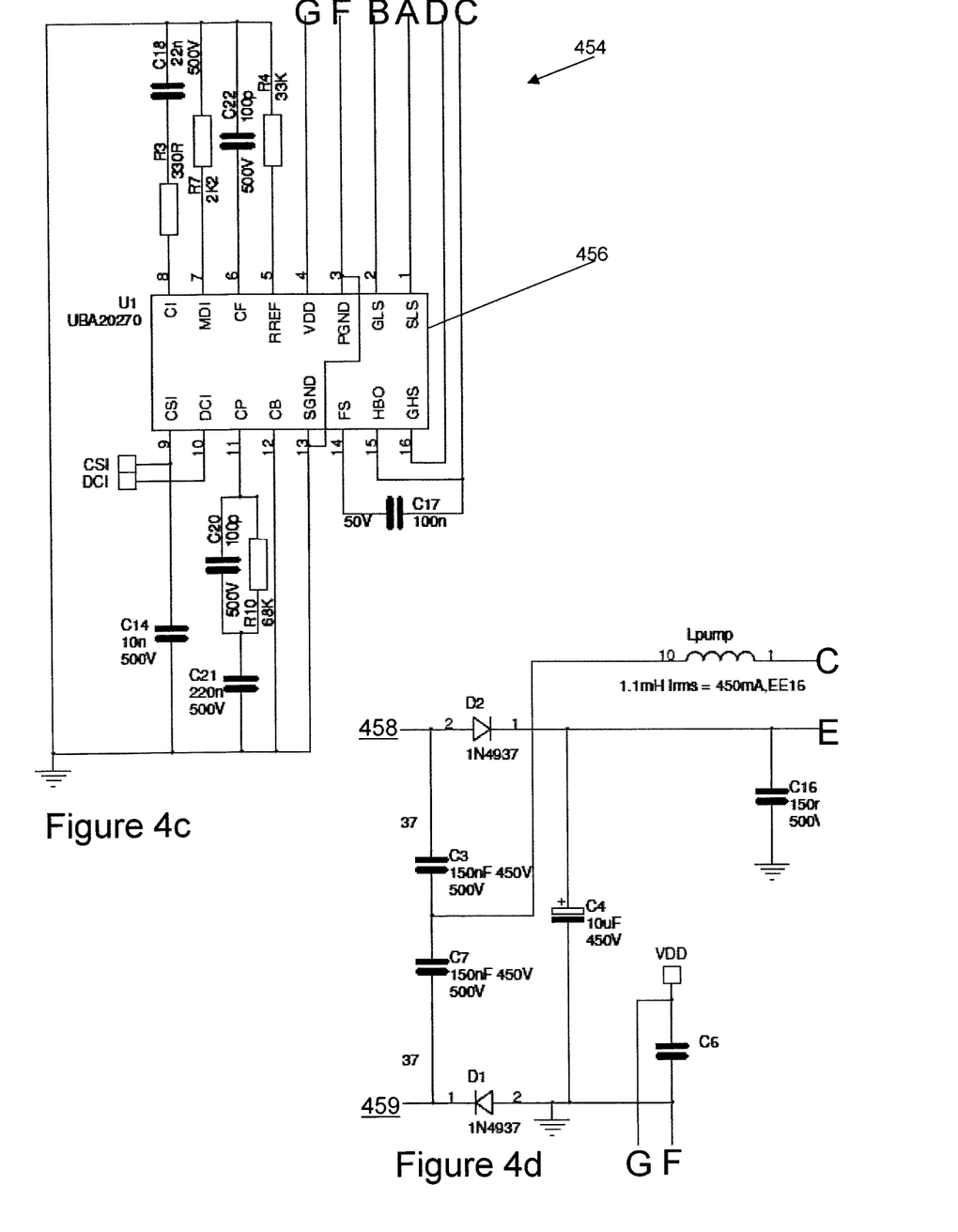

The components of the resonant converter 400 that relate to the operation of the primary side 402 are well known in the art and not discussed in detail with regard to FIG. 4. However, for completeness, an example primary side controller 454 and primary side rectifier 456 are illustrated in FIGS. 4c and 4d, respectively.

The components on the primary side 402 of the resonant converter 400 illustrated in FIG. 4a include:
- a first converter switch 410;
- a second converter switch 412 that has a conduction channel that is coupled in series with a conduction channel of the first converter switch 410; and
- a resonant tank capacitor 424.

The resonant converter 400 comprises a switching transformer 414 with a primary side winding 416, a first secondary side winding 418a and a second secondary side winding 418b. The primary side winding 416 is coupled in parallel with the second converter switch 412. A first terminal of the primary side winding 416 is connected at the node between the conduction channels of the first and second converter switches 410, 412. A second terminal of the primary side winding 416 is coupled to ground via the resonant tank capacitor 424. The switching transformer 414 is configured to transfer energy from its primary side winding 416 to its first and second secondary side windings 418a, 418b.

An additional capacitor 425 is also provided between the first terminal of the primary side winding 416 and ground. A Zener diode may also be provided between the additional capacitor 425 and ground. A Zener diode may also be provided between the additional capacitor 425 and a positive input supply VDD.

The resonant converter 400 also comprises a signalling transformer 434 with a primary side winding 436, a first secondary side winding 438a and a second secondary side winding 438b. The first and second secondary side windings 438a, 438b of the signalling transformer 434 are connected in series with the respective first and second secondary side windings 418a, 418b of the switching transformer 414. The secondary side windings 438a, 438b of the signalling transformer 434 are configured to transfer a signal from the secondary side 404 of the resonant converter 400 to the primary side winding 436 of the signalling transformer 434 on the primary side 402 of the resonant converter 400.

The inductance of the windings of the signalling transformer 434 may be lower (for example, 3 orders of magnitude or more lower) than the inductance of the windings of the switching transformer 414. As such, a small and relatively inexpensive transformer can be provided as the signalling transformer 434.

The signalling transformer 434 is connected such that a current from the first secondary side winding 418a of the switching transformer 414 (which may also be referred to as a resonant transformer) builds flux in the first secondary side winding 438a of the signalling transformer 434 in one direction and the second secondary side winding 418b of the switching transformer 414 builds flux in the opposite direction in the second secondary side winding 438b of the first winding of the signalling transformer 434. The net result of this arrangement is that an AC flux is induced in the primary side winding 436 of the signalling transformer 434.

A sensing resister 450 is coupled in parallel with the primary side winding 436 of the signalling transformer 434. A first terminal of the sensing resistor 450 is coupled to ground. A second terminal of the sensing resistor 450 is coupled to a current sense input (CSI) 439 of a primary side controller (discussed further below with relation to FIG. 4c). An AC voltage due to the AC current through the primary side winding 436 of the signalling transformer 434 is formed over the secondary sensing resistor 450. The AC voltage is directly proportional to the current in a load 446 of the resonant converter 400 in this example.

FIG. 4b illustrates an alternative arrangement with the primary side of the signalling transformer 434b in which a pair of Zener diodes 452a, 452b are coupled in series with each other and with mutually opposing bias. The series Zener diodes 452a, 452b are provided in parallel with the sense resistor 450b. The series Zener diodes 452a, 452b provides a maximum limit for the voltage that can be dropped across the sense resistor 450b.

FIG. 4c illustrates an example primary side controller 454. The primary side controller 454 is configured to control the operation of the first and second converter switches 410, 412 in response to the voltage measured across the sensing resistor 450. The primary side controller 454 may, for example, ensure that the power, current or voltage at the load terminal 441 is within a tolerable range of a desired level.

In this example, the primary side controller 454 is built using a UBA20270 high-voltage power IC 456, although it will be appreciated that the primary side controller 454 can be implemented differently. This IC 456 is described in detail in the application note, UBA20270, "600 V Driver IC for dimmable compact fluorescent lamps", Rev. 2 (8 Sep. 2011) by NXP Semiconductors. Pin 1 (SLS) of the IC 456 is coupled to a source terminal of the second converter switch 412 (at reference 'A' illustrated in FIG. 4a). Pin 2 (GLS) of the IC 456 is coupled to a gate terminal of the second converter switch 412 (at reference 'B' illustrated in FIG. 4a). Pin 15 (HBO) of the IC 456 is coupled to a source terminal of the first converter switch 410 and to a drain gate terminal of the second converter switch 412 (at reference 'C' illustrated in FIG. 4a). Pin 16 (GHS) of the IC 456456 is coupled to a gate terminal of the first converter switch 410 (at reference 'D' illustrated in FIG. 4a). Pin 10 (DCI) may be provided with an input signal that indicates a level of dimming to be applied at the primary side 402, although pin 10 is not used in the example described with reference to FIG. 4.

Returning to FIG. 4a, a first terminal of the first secondary side winding 418a of the switching transformer 414 is coupled to a first terminal of the second secondary side winding 418b of the switching transformer 418b and to ground. A second terminal of the first secondary side winding 418a of the switching transformer 414 is coupled to a first terminal of the first secondary side winding 438a of the signalling transformer 434. A second terminal of the first secondary side winding 438a of the signalling transformer 434 is coupled to a load terminal 441 via a first rectifier 442. A second terminal of the second secondary side winding 418b of the switching transformer 414 is coupled to a first terminal of the second secondary side winding 438b of the signalling transformer 434. A second terminal of the second secondary side winding 438b of the signalling transformer 434 is coupled to the load terminal 441 via a second rectifier 444.

An optional capacitor 452 and an optional resistor 454 are provided in series between the second terminal of the first secondary winding 418a of the switching transformer 414 and the second terminal of the second secondary winding 418b of the switching transformer 414. The capacitor 452 and resistor 454 ensure that some current can flow through the secondary side windings 418a, 418b of the switching transformer 414 when neither the first rectifier 442 nor the second rectifier 444 is conducting current (before the turn-on voltage is reached). Without a secondary side winding current, the primary side winding current is low which can cause hard switching of the first and second converter switches 410, 412 to occur.

The first rectifier 442 and the second rectifier 444 each have an anode and a cathode. The polarity of the first rectifier 442 is the same as the polarity of the second rectifier 444. The cathode of the first rectifier 442 is connected to the cathode of the second rectifier 444 at the load terminal 441. As an alternative, the anode of the first rectifier 442 may be connected to the anode of the second rectifier 444 at the load terminal 441. The first and second rectifiers 442, 444 can together be considered to provide a rectifier stage 426. In the example shown, the first and second rectifiers 442, 444 are provided by Shottky diodes.

A load 446 is illustrated between the load terminal 441 and ground. A smoothing capacitor 448 is also provided between the load terminal 441 and ground. The load 446 comprises a string of LEDs 449 in this example, but it will be appreciated that the load 446 may be any type of load. The resonant converters described herein may be particularly suited for providing power to a load that requires a constant current.

For completeness, FIG. 4d illustrates additional components and supply terminals 458, 459 that receive a DC voltage, which may have been rectified from an AC power supply, for supplying to the resonant converter 400 and IC 456. Reference points 'C' and 'E' in FIG. 4d are coupled to the corresponding references in FIG. 4a. The reference point 'E' in FIG. 4a is provided at the drain of the first converter switch 410. Pin 3 (PGND) of the IC 456 shown in FIG. 4c is connected to ground at reference point 'F' in FIG. 4d. Pin 4 (VDD) of the IC 456 shown in FIG. 4c is connected to VDD at reference point 'G' in FIG. 4d.

The resonant converters of FIGS. 3 and 4 may be implemented in a resonant converter LED driver in the 30-50 W power range. Such resonant converters may incur a substantially lower bill of materials (BOM) compared to a solution that use an opto-coupler to feed back information from the secondary side to the primary side, as shown by the example of FIG. 2. The resonant converters of FIGS. 3 and 4 may, however, provide the same or similar performance in terms of responsiveness and power efficiency as the example of FIG. 2.

Figure 5:
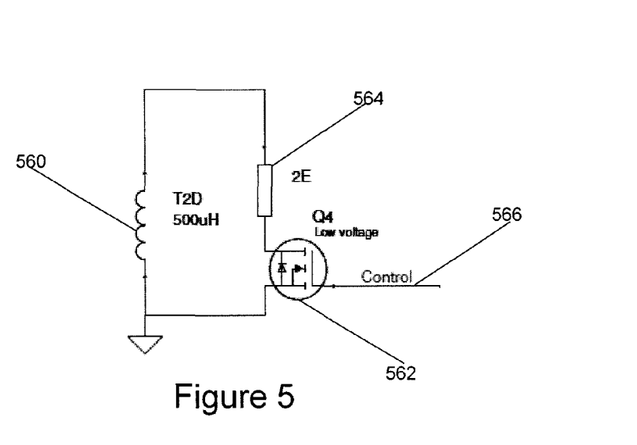
FIG. 5 illustrates additional components that may be associated with the signalling transformer of the resonant converters of FIGS. 3 and 4.

FIG. 5 illustrates additional circuit elements that may be provided to the resonant converters of FIGS. 3 and 4. In this example, a setting of the primary controller (such as a desired output current, voltage or power level) can be controlled from the secondary side of the resonant converter. Such control enables an LED driver with "deep dimming" capability to be implemented. The required dimming (or brightness level) can be provided by user input. For example, a secondary side controller may compare a user input level to a detected current or voltage at the second side of the resonant converter. The secondary side controller may control a flow of energy through an additional winding 560 in response to the current and/or user input, or in response to a comparison between the current and the user input.

In order to perform deep dimming, a secondary side controller is provided in order to: sense the load current; and keep the resonant converter running (using principles known to those skilled in the art). In order to keep the resonant converter running, the secondary side controller controls the power/current that the primary side controller induces in the primary side winding of the switching transformer and also 'burns' power at the secondary side of the converter.

FIG. 5 shows an additional secondary side winding 560 that may be provided on the signalling transformer of the resonant converter illustrated in FIG. 3 or 4. The 'burning' of power can be achieved by shorting the additional secondary side winding 560 in order to drop a voltage across a burn resistor 564. A secondary side control switch 562 is connected across a first and second terminal of the additional secondary side winding 560. In this example, the switch is a transistor arrangement that comprises a diode that is coupled in parallel with a conduction channel of the transistor. The burn resistor 564 is provided between the first terminal of the additional secondary side winding 560 and the secondary side control switch 562. Therefore, the additional secondary winding 560, secondary side control switch 562 and burn resistor 564 are connected in series.

The maximum power output of the resonant converter can be achieved by closing, and keeping closed, the secondary side control switch 562 so that the conduction channel of the secondary side control switch 562 allows current to flow. Energy in the additional winding 560 is dissipated by the burn resistor 560. The secondary side control switch 562 can be closed in accordance with a control signal 566 received from the secondary side controller (not shown). Alternatively, the control signal 566 can keep the secondary side control switch 562 open so that the minimum power/current output of the resonant converter can be obtained. The minimum power output of the resonant converter is typically around 10-30% of the nominal output current of the resonant converter. If further dimming (or, more generally, reduction in output power) is needed, the secondary side controller enables this by controlling the load close to invisible by the primary side by methods known to those skilled in the art of making LED drivers. These mechanisms relate to making sure that there is always a current through the secondary side winding of the switching transformer. If there is no such secondary side winding current then there can be no, or almost no, primary side winding current. The resonant tank may require a current always to be flowing in order to keep the first and second converter switches 410, 412 switching correctly. That is, to prevent hard switching or operating in a capacitive mode.

It will be appreciated that features described with regard to one example may be combined with features described with regard to another example, unless an intention to the contrary is apparent.

The invention claimed is:

1. A resonant converter having a primary side for receiving a DC voltage from an input power supply and a secondary side for providing a DC output voltage, the resonant converter comprising:
   a first converter switch;
   a second converter switch coupled in series with the first converter switch, wherein the first and second converter switches are provided across the input power supply;
   a switching transformer with a primary side winding and a secondary side winding, wherein the primary side winding is coupled in parallel with the second converter switch, the switching transformer configured to transfer energy from the primary side winding to the secondary side winding of the switching transformer;
   a resonant tank associated with the primary side winding of the switching transformer;
   a signalling transformer with a primary side winding and a secondary side winding, wherein the secondary side winding of the signalling transformer is connected to the secondary side winding of the switching transformer and configured to transfer a signal from the secondary side winding of the signalling transformer to the primary side winding of the signalling transformer; and
   a primary side controller configured to control the first and second converter switches in response to the signal received at the primary side winding of the signalling transformer,
   wherein the switching transformer has a first secondary side winding and a second secondary side winding and the signalling transformer has a first secondary side winding and a second secondary side winding,
wherein a first terminal of the first secondary side winding of the switching transformer is coupled to a first terminal of the second secondary side winding of the switching transformer and to ground, a second terminal of the first secondary side winding of the switching transformer is coupled to a first terminal of the first secondary side winding of the signalling transformer, a second terminal of the second secondary side winding of the switching transformer is coupled to a first terminal of the second secondary side winding of the signalling transformer.

2. The resonant converter of claim 1, wherein the primary and secondary windings of the signalling transformer have a substantially lower inductance than the primary and secondary windings of the switching transformer.

3. The resonant converter of claim 2, wherein the inductance of the signalling transformer is 3 orders of magnitude lower than the inductance of the switching transformer.

4. The resonant converter of claim 1, wherein the signalling transformer is substantially isolated from a magnetic field generated by the switching transformer.

5. The resonant converter of claim 1, wherein the primary side controller is configured to control the first and second converter switches in order to provide a constant current at the output power supply.

6. The resonant converter of claim 1, wherein the secondary side winding of the signalling transformer is coupled in series with the secondary side winding of the switching transformer.

7. The resonant converter of claim 6, wherein the secondary side winding of the signalling transformer is coupled in parallel with a sense resistor.

8. A light emitting diode, LED, driver circuit comprising the resonant converter of claim 1.

9. The resonant converter of claim 1, wherein a second terminal of the first secondary side winding of the signalling transformer is coupled to a load terminal and a second terminal of the second secondary side winding of the signalling transformer is coupled to the load terminal.

10. The resonant converter of claim 9, wherein the load terminal is respectively coupled to the first and second secondary side windings of the signalling transformer by first and second rectifiers and wherein the polarity of the first rectifier is the same as the polarity of the second rectifier.

11. The resonant converter of claim 10, wherein at least one of the first and second rectifiers is a synchronous rectifier.

12. The resonant converter of claim 1, wherein the signalling transformer further comprises an additional secondary side winding, the resonant converter further comprising a secondary side controller that is configured to control a flow of energy through the additional secondary side winding in response to receiving a control signal or in response to a current in the secondary side of the resonant converter.

13. The resonant converter of claim 12, wherein the secondary side controller is configured to short circuit the additional secondary side winding in response to receiving the control signal or in response to a current in the secondary side of the resonant converter.

14. The resonant converter of claim 12, wherein the secondary side controller is configured to receive the command as a user input.

* * * * *